United States Patent Office 3,091,205
Patented May 28, 1963

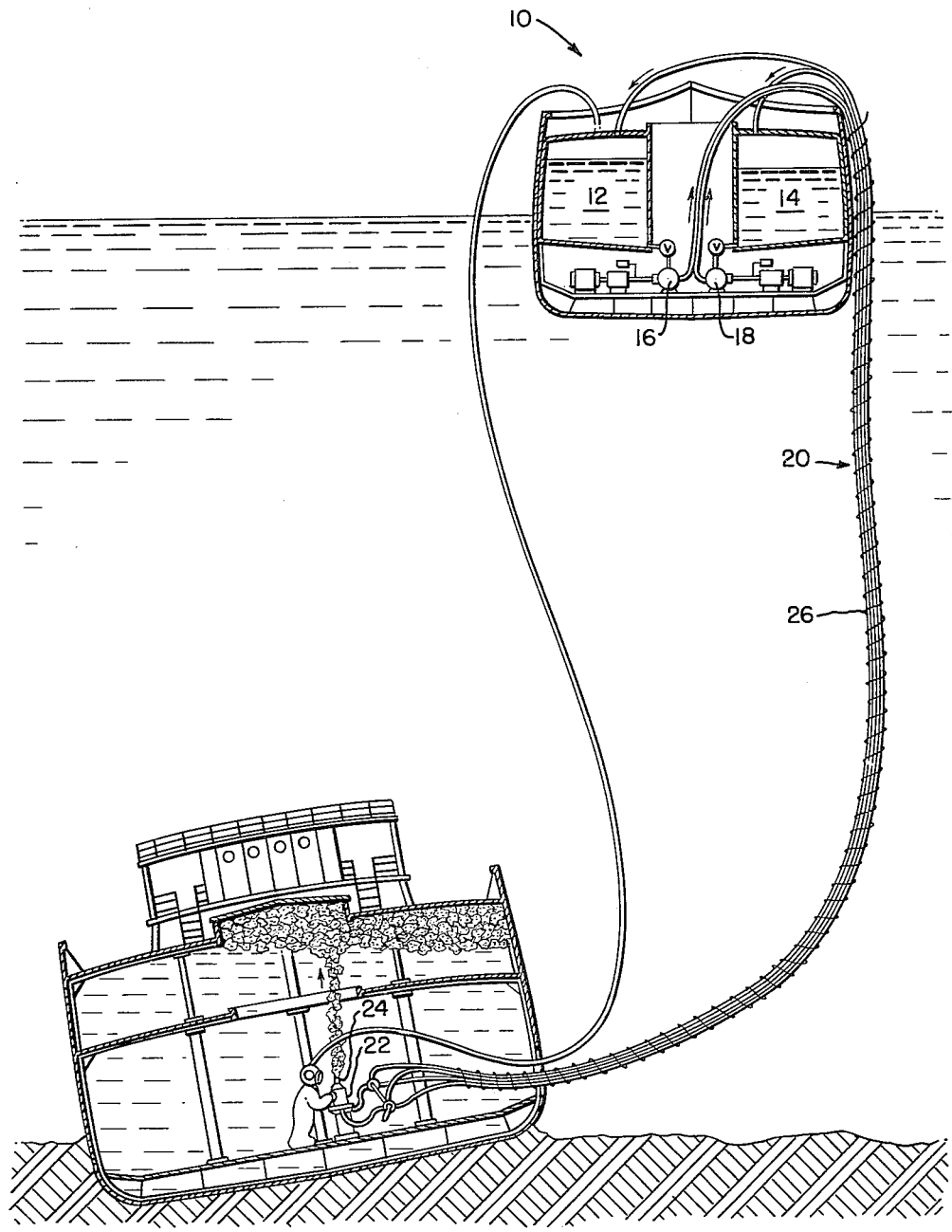

3,091,205
METHOD OF RAISING SUNKEN VESSELS
William Watson, Bradlee Road, Marblehead, Mass.
Filed Aug. 16, 1957, Ser. No. 678,554
2 Claims. (Cl. 114—50)

This invention relates to a method for raising sunken vessels and in particular to a procedure by means of which buoyancy is restored to the vessel itself without the use of pontoons.

In the past sunken vessels have been raised from the sea bottom by a combination of two methods. If the vessel has compartments which are or can be made watertight, the water may be pumped out from such compartments and replaced with air, the process being repeated until the total volume of air-filled watertight compartments is sufficient to impart buoyancy to the vessel as a whole. It has also been the practice to sink pontoons into position where they can be moored to the vessel, the pontoons being subsequently filled with air in order that they may exert lifting force on the vessel. While such methods are often satisfactory, they have severe limitations. The lifting capacity to be secured from pontoons is not great enough to raise a sizeable ship, and many vessels are not equipped with watertight compartments of sufficient volume to impart the desired degree of buoyancy to the ship.

In accordance with my invention I form within the interior of a sunken ship a quantity of plastic foam of closed cell form which displaces the water and imparts buoyancy to the vessel. The foam is formed in situ, and the operation of the method does not require watertight compartments in view of the fact that it is the buoyancy of the foam which operates to lift the vessel and not the effect of an air-filled watertight compartment.

In practicing the method of the invention I provide a salvage vessel equipped with tanks adapted to contain the two fluids which are to be mixed to form the foam, pumps for handling the fluids, a multi-conduit hose terminating in a mixing head and nozzle and adapted to be inserted in the interior of the sunken vessel, and the necessary auxiliary apparatus as will hereinafter more specifically be described.

These and other aspects of the invention will be more readily understood and appreciated from the following detailed description of a preferred embodiment thereof selected for purposes of illustration and shown in the accompanying FIGURE.

This invention does not relate to any particular plastic foam, since there are many formulations suitable for use in practicing the method of the invention. Those skilled in the art will readily appreciate the commercial availability of suitable materials and the factors which must be taken into consideration in selecting the foam to be used. As an example of a suitable material, there may be employed a mixture of a polyisocyanate and a resinous polymer. One suitable series of satisfactory foaming materials is currently sold by Nopco Chemical Company under the trademark "Nopco Lockfoam," and other types are currently on sale by E. I. DuPont de Nemours & Company and Monsanto Chemical Company. The foam selected must have relatively low water absorption characteristics, be of the closed cell type as opposed to the interconnecting cell type, and be capable of formation by the mixture of two fluids under pressure.

As shown in the drawing there is provided a salvage vessel 10 equipped with a pair of tanks 12 and 14, one of which contains a liquid resinous material such as a polyester resin, an epoxy resin, an alkyd resin, or a phenolic resin. In the other tank there is a catalyst, generally one of the amines or peroxides. A pair of pumps 16 and 18 serve the tanks 12 and 14 and are arranged to pump fluid from the tanks into a multi-conduit hose 20 suspended over the side of the vessel and terminating at its lower end in a valve controlled mixing head 22 where the two fluids are mixed and discharged through a nozzle 24. The hose 20 has four conduits, two of which are connected to the pumps 16 and 18 at their upper ends and at their lower ends to three-way valves by means of which the fluids may either be directed into the mixing head 22 or returned through the other two conduits of the hose 20 back into the tanks 12 and 14. Some types of foams require that the materials be heated prior to mixing, and in such cases the hose 20 is provided with a coiled heating element 26 connected to a suitable source of current on the salvage vessel 10.

In connection with the equipment thus far described useful detailed information will be found in a sales bulletin published by Gabriel Williams Co., Inc. of Freeport, Long Island, describing "Kluder Williams Foam Machines." The invention contemplates the use of similar hoses and mixing head, although the equipment used in practicing the method of the invention will necessarily be constructed to withstand the higher pressures involved.

In applying the foam to the interior of a second vessel, a diver inserts the nozzle in an opening in the hull and operates the valve to direct the two fluids into the mixing head for intimate mixing and discharge through the nozzle 24. It is of course necessary that the pumps develop sufficient pressure to overcome the hydrostatic pressure, the pump pressure being dictated by the depth to which the sunken vessel lies.

If the compartment of the vessel into which the foam is directed is reasonably tight, though it need not be watertight, nothing more is required. If, however, it is desired to introduce the foam into a compartment having a relatively large opening at the top, such as a compartment opening into a companionway, divers must first cover the upper openings with a barrier of screening or boards. Inasmuch as the foam is buoyant after it has formed, it will rise to lodge against the barrier and conform exactly to the configuration of the compartment being filled.

The process described is repeated in various compartments of the sunken vessel until sufficient water has been displaced by the buoyant foam to render the vessel as a whole sufficiently buoyant to become lifted from the sea bottom. Of course, the "bottom" suction may be overcome in conventional fashion, as by hydraulically washing away mud from the ship's bottom.

After the vessel has been brought to the surface, or sufficiently near it, it may be towed to dry-dock. After the vessel has been dry-docked, the plastic foam may then be cut out very easily. The removal of the foam from the interior of the ship presents no problem.

Those skilled in the art will readily appreciate that there are many variations and alternatives to the specific operations described above, and the scope of the invention is not limited by the foregoing but is rather measured by the claims appended hereto.

Having thus disclosed my invention, what I claim as new and desire to secure by Letters Patent of the United States is:

1. The method of imparting buoyancy to a sunken ship comprising the steps of pumping a fluid resin into a water-filled compartment of the ship from a salvage vessel, through a first hose, the hydrostatic pressure in the compartment being substantially above atmospheric pressure, pumping a fluid catalyst capable of acting on the resin to form a closed cell buoyant foam into the ship from the salvage vessel through a second hose, mixing the catalyst with the resin, and injecting the mixture into the water in the compartment to generate a buoyant foam displacing the water from the compartment by expansion.

2. The method of salvaging a sunken ship comprising the steps of pumping a fluid resin into a water-filled portion of the ship through a first hose, the hydrostatic pressure in the water-filled portion being substantially above atmospheric pressure, pumping a fluid catalyst capable of acting on the resin to form a closed cell buoyant foam into the ship through a second hose, mixing the catalyst with the resin, injecting the mixture into the water filling said portion to generate a buoyant foam displacing the water from the portion by expansion and filling said portion with solid, buoyant plastic foam, and, after the ship is raised under the influence of the buoyancy imparted by the plastic foam, cutting out the foam in sections to clear said portion.

References Cited in the file of this patent

UNITED STATES PATENTS

| | | |
|---|---|---|
| 908,016 | Lake | Dec. 29, 1908 |
| 1,368,787 | Graff | Feb. 15, 1921 |
| 1,772,709 | Culbertson | Aug. 15, 1930 |
| 2,653,139 | Sterling | Sept. 22, 1953 |
| 2,758,194 | Heron | Aug. 7, 1956 |
| 2,764,565 | Hoppe et al. | Sept. 25, 1956 |
| 2,779,689 | Reis | Jan. 29, 1957 |

FOREIGN PATENTS

| | | |
|---|---|---|
| 950,050 | Germany | Oct. 4, 1956 |